(12) United States Patent
Frieder et al.

(10) Patent No.: US 12,399,285 B2
(45) Date of Patent: *Aug. 26, 2025

(54) APPARATUS AND PROCESS FOR OPTIMIZING RADIATION DETECTION COUNTING TIMES USING MACHINE LEARNING

(71) Applicants: Oregon State University, Corvallis, OR (US); Georgetown University, Washington, DC (US)

(72) Inventors: Ophir Frieder, Chevy Chase, MD (US); Steven Richard Reese, Corvallis, OR (US); Jessica Ryan Curtis, Corvallis, OR (US)

(73) Assignees: Oregon State University, Corvallis, OR (US); Georgetown University, Washington, DC (US)

( * ) Notice: Subject to any disclaimer, the term of this patent is extended or adjusted under 35 U.S.C. 154(b) by 263 days.

This patent is subject to a terminal disclaimer.

(21) Appl. No.: 18/053,344

(22) Filed: Nov. 7, 2022

(65) Prior Publication Data
US 2025/0004146 A1    Jan. 2, 2025

Related U.S. Application Data

(63) Continuation of application No. 17/540,096, filed on Dec. 1, 2021, now Pat. No. 11,531,121, which is a
(Continued)

(51) Int. Cl.
*G01T 1/18* (2006.01)
*G01T 1/17* (2006.01)
*G01T 1/36* (2006.01)

(52) U.S. Cl.
CPC .................. *G01T 1/18* (2013.01); *G01T 1/36* (2013.01); *G01T 1/17* (2013.01)

(58) Field of Classification Search
CPC ................ G01T 1/18; G01T 1/36; G01T 1/17
See application file for complete search history.

(56) References Cited

U.S. PATENT DOCUMENTS

| 7,024,033 B2 | 4/2006 | Li et al. |
| 7,580,505 B2 | 8/2009 | Kang et al. |

(Continued)

OTHER PUBLICATIONS

Dalal, S., "Detection of radioactive material entering national ports: A Bayesian approach to radiation portal data", Ann. Appl. Stat. 4 (2010), No. 3, 1256-1271.

(Continued)

*Primary Examiner* — David P Porta
*Assistant Examiner* — Fani Polyzos Boosalis
(74) *Attorney, Agent, or Firm* — MUGHAL GAUDRY & FRANKLIN PC

(57) ABSTRACT

A method is provided to reduce the counting times in radiation detection systems using machine learning, wherein the method comprises: receiving output data from a detector which is to detect a target material from a target body; analyzing the output data; identifying a material of interest from the analyzed output data; and controlling a source of the target material to prevent the source from harming the target body. An apparatus is also provided which comprises: a detector to detect radiation and to provide an output data in real-time; and a processor coupled to the detector, wherein the processor is to: receive the output data; analyze the output data; identify a material of interest from the analyzed output data; and control a source of the target material.

20 Claims, 7 Drawing Sheets

Related U.S. Application Data continuation of application No. 16/978,156, filed as application No. PCT/US2019/020613 on Mar. 4, 2019, now Pat. No. 11,249,199.

(60) Provisional application No. 62/644,297, filed on Mar. 16, 2018.

(56) References Cited

U.S. PATENT DOCUMENTS

| | | | |
|---|---|---|---|
| 7,711,661 | B2 | 5/2010 | Gentile et al. |
| 2003/0110147 | A1 | 6/2003 | Li et al. |
| 2006/0056576 | A1 | 3/2006 | Hoffman et al. |
| 2006/0064017 | A1 | 3/2006 | Krishnan et al. |
| 2015/0043801 | A1 | 2/2015 | Altman et al. |
| 2016/0140300 | A1 | 5/2016 | Purdie et al. |

OTHER PUBLICATIONS

Final Office Action notified Sep. 14, 2021 for U.S. Appl. No. 16/978,156.

Frank, E. et al., "The WEKA Workbench. Online Appendix for Data Mining: Practical Machine Learning Tools and Techniques", Morgan Kaufmann, Fourth Edition, 2016.

International Preliminary Report on Patentability notified Oct. 2, 2020 for PCT Patent Application No. PCT/US2019/020613.

International Search Report & Written Opinion notified Jun. 6, 2019 for PCT Patent Application No. PCT/US2019/020613.

Kangas, L. et al., "The use of artificial neural networks in PVT-based radiation portal monitors", Nuclear Instruments and Methods in Physics Research Section A: Accelerators, Spectrometers, Detectors and Associated Equipment, vol. 587, Issues 2-3, 2008, pp. 398-412.

Lakhani, P. et al., "Deep learning at Chest Radiography: Automatic classification of pulmonary tuberculosis by using convolutional neural networks", Radiology 284(2), pp. 574-582, 2017.

Non-Final Office Action notified May 17, 2021 for U.S. Appl. No. 16/798,156.

Notice of Allowance notified Oct. 14, 2021 for U.S. Appl. No. 16/978,156.

Notice of Allowance notified Oct. 19, 2022 for U.S. Appl. No. 17/540,096.

Sahiner, S. "Gamma Spectroscopy by Artificial Neutral Network coupled with MCNP", PhD Dissertation, Missouri University of Science and Technology, Rolla, MO, 2017.

Shin, H. et al., "Deep convolutional neural networks for computer-aided detection: CNN architectures, dataset characteristics and transfer learning", IEEE Trans Med Imaging, 35(5), pp. 1285-1298, 2016.

Vigneron, V. et al., "Statistical modelling of neural networks in gamma spectroscopy", Conference and International Symposium on Radionuclide Metrology, Paris, France, May 1995.

Yoshida, E. "Application of neutral networks for the analysis of gamma ray spectra measured with a Ge spectrometer", Nuclear Instruments and Methods in Physics, Research A, 484 pp. 557-563, 2002.

| Channel | Interval | | | | | | | | | |
|---|---|---|---|---|---|---|---|---|---|---|
| | 1 | 2 | 3 | 4 | 5 | 6 | 7 | 8 | 9 | 10 |
| 338 | 48 | 50 | 50 | 49 | 38 | 48 | 48 | 36 | 47 | 39 |
| 339 | 53 | 60 | 61 | 37 | 31 | 51 | 47 | 41 | 47 | 39 |
| 340 | 58 | 71 | 58 | 46 | 47 | 36 | 41 | 43 | 37 | 34 |
| 341 | 51 | 46 | 44 | 42 | 52 | 36 | 33 | 35 | 35 | 29 |

Fig. 2B

APPARATUS AND PROCESS FOR OPTIMIZING RADIATION DETECTION COUNTING TIMES USING MACHINE LEARNING

CLAIM OF PRIORITY

This application is a Continuation Application of and claims the benefit of priority to U.S. patent application Ser. No. 17/540,096, filed Dec. 1, 2021, now issued as U.S. Pat. No. 11,531,121 on Dec. 20, 2022, and which is a Continuation Application of and claims the benefit of priority to U.S. patent application Ser. No. 16/978,156, filed Sep. 3, 2020, now issued as U.S. Pat. No. 11,249,199 on Feb. 15, 2022, which is a National Phase application of, and claims the benefit of priority to PCT Patent Application No. PCT/US2019/020613, filed Mar. 4, 2019, which claims the benefit of priority to U.S. Provisional Patent Application No. 62/644,297, filed Mar. 16, 2018, which is incorporated by reference in its entirety for all purposes.

BACKGROUND

Systems used to detect radiation or determine the content of radioactive material are common in a multitude of nuclear science applications including, but not limited to, passive and active interrogation systems located at border crossings, common gamma spectroscopy systems used to analyze samples in a variety of environments in the nuclear industry, and detection of radiation from therapeutic treatments or diagnostic imaging applications in nuclear or imaging medicine. Most practical applications involve a radiation detector (of which there are many kinds), process signal electronics, and some analytical approaches to determining the presence and/or amount of radiation or radioactive material being measured. The analytical approaches typically used involve collection of detector data over a finite or defined period of time followed by analysis of the integrated counts collected over that time. The start-and-stop process is repeated and necessarily involves time periods between collection cycles where the analysis is being performed instead of collecting more data. Herein, a novel approach is described that utilizes machine-learning techniques to eliminate this cyclic pattern and provides information in real-time.

Machine learning, which is also referred to herein as statistical analysis, data mining, or data analytics, is currently regarded as a subfield of computer science. However, the applicability of machine learning to tasks not commonly attributed to computer science is widely touted. Through algorithmic methods, machine learning is able to address complex data tasks. Scientists postulate the data creation or curation from a particular model or they assume an unknown model and apply algorithmic methods to the data to reach conclusions. The latter ensures a data-driven process and supports an innovative way of solving complex data problems. Machine learning techniques are increasingly used in the radiation space discipline-wide. For example, neural networks (NN) and support vector machines-based solutions such as interpreted gamma-ray spectroscopy data and a neutral network approach recognizing patterns for spectral analysis from High-purity Germanium (HPGe) detectors are known machine learning applications. However, these approaches are limited in their detection speed and post detection operations.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated here, the approaches described in this section are not prior art to the claims in the present disclosure and are not admitted to be prior art by inclusion in this section.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 2B illustrates a matrix generated from collected detector data.

DETAILED DESCRIPTION OF EXEMPLARY EMBODIMENTS

Figure 1A:
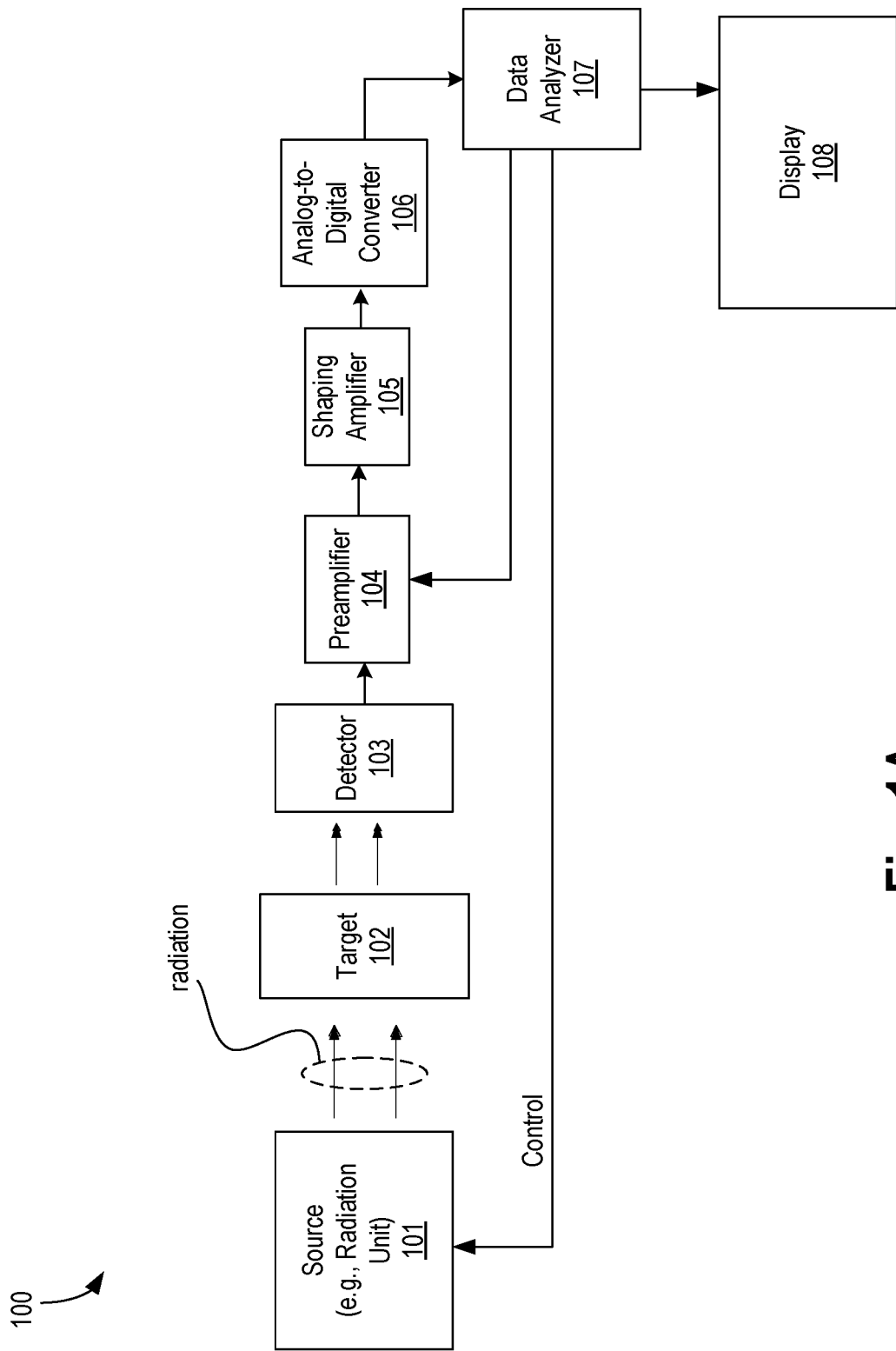
FIG. 1A illustrates an apparatus and/or system with active emission and detection of radiation for optimizing nuclear or radiological counting using machine learning, in accordance with some embodiments.

Some embodiments describe an apparatus and method for performing an analytical method to minimize the time necessary to produce a required signal in an environment. Various embodiments here are described with reference to nuclear or radiological counting environments. However, the embodiments are not limited to such and can be used for any suitable environment where a material is to be identified from raw data and then a decision needs to be made about the usage of the material. By optimizing (e.g., minimizing or reducing) the counting time of the detected radioactive material, the speed and efficiency of determining the amount or presence of the radioactive material or obtaining the required contrast is improved. In some embodiments, a dynamic material identification counting architecture, called Frieder Counting, is provided. This counting architecture involves collecting raw count data from a counting system and using machine learning, data mining, or statistical or data analytics techniques, used interchangeably herein, to both optimize (e.g., minimizing or reducing) the counting times involved and to provide real-time indication of the presence or identification of radiation or radionuclides.

Gamma spectroscopy is one example of how the method of various embodiments is applied. Gamma spectroscopy is the process of collecting photon interactions with a detector to determine information on the energy of the original photon. Detectors used in gamma spectroscopy involve materials where energy information can be collected. In one non-limiting example, NaI(Th) scintillators or solid state semiconductor detectors such as high purity germanium detectors are used.

As is known in the art, for example, U.S. Pat. No. 7,711,661 issued to Gentile et al., such systems usually involve a series of electronics to perform signal processing. This process, illustrated in FIG. 1A and FIG. 1B, includes but is not limited to: (1) collecting pulses from a detector, (2) amplifying and conditioning the signal detected with a preamplifier, (3) shaping the signal with an amplifier, (4) using an analog-to-digital converter to digitize the signal, (5) using a multi-channel analyzer to associate the signal with a channel or energy, and eventually (6) entering, either directly electronically or manually, this aforementioned information into a software package. The software package serves as a platform for performing identification and/or quantification and as an interface with the user, in accordance with various embodiments.

Most common approaches to gamma spectroscopy involve counting a radioactive sample for a predetermined fixed length of time and interpreting the spectrum produced. Interpretation involves first a deconvolution of the spectrum to identify any valid peaks that may be present. The process of determining whether a peak is valid usually involves some determination as to how close the peak resembles a Gaussian shape and then determining if the peak itself significantly differs from the continuum in the spectrum.

The number of counts within a given peak follows rules associated with a Poisson distribution, and thus, distinguishing a given peak from the background. When performing gamma spectroscopy, a user typically counts for a predetermined time. The count time duration is determined a priori in response to a combination of measuring resource constraints, the materials involved, default parameters, or any relevant limiting conditions known in the art. Once the count time has concluded, the user evaluates the spectrum to determine what, if any, radionuclides are present. Longer count times are associated with greater sensitivity. Therefore, if the count time does not produce the required sensitivity, sometimes referred to as the minimum detectable activity (or the threshold activity), the user will usually simply count longer until achieving the desired sensitivity. Regardless, the original count time is based on best information a priori. This situation either results in an iterative series of count times until achieving the desired sensitivity or a standard count time is chosen that will more than likely encompass the sensitivity desired.

Some embodiments describe a hardware and associated software methodology to eliminate the need for a priori information and instead utilize techniques in machine learning to analyze counting information in real-time to solve for the optimal counting time associated with what is observed in the counts. This will more quickly provide information on the identification and quantity of a target material (e.g., radioactive material) present. Other technical effects will be evident from the various embodiments and figures.

The embodiments of the disclosure will be understood more fully from the detailed description given below and from the accompanying drawings of various embodiments of the disclosure, which, however, should not be taken to limit the disclosure to the specific embodiments, but are for explanation and understanding only.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction, and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "module" or "logic" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

The term "real-time" here generally refers to systems that respond under real-time or live constraints and generates a result within a time frame (e.g., in few or less microseconds).

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

FIG. 1A illustrates an apparatus and/or system 100 with active emission and detection of radiation for optimizing nuclear or radiological counting using machine learning, in accordance with some embodiments. Apparatus and/or system 100 comprises a radiation unit 101, a detector 103, a preamplifier 104, a shaping amplifier 105, an analog-to-digital converter (ADC) 106, and a data analyzer 107 for optimizing nuclear or radiological counting using machine learning, and display 108.

In some embodiments, radiation unit 101 is any suitable hardware that transmits certain amount of material to a target 102. For example, radiation unit 101 may be an X-ray machine that radiates X-rays to a target. In some embodiments, detector 103 is used to detect the output of radiation unit 101. In some embodiments, detector 103 comprises one or more of a neutron detector, an X-ray radiation detector, an electromagnetic radiation detector (e.g., detector to detect electromagnetic radiation with a continuous spectrum produced by the acceleration of a charged particle, such as an electron, proton, alpha or beta particle, when deflected by another charged particle, such as an atomic nucleus), a radioactive material detector (e.g., alpha and/or beta radiation detector), a gamma radiation detector, etc. In some embodiments, a converter is provided which may take the form of a detector suitable for detecting X-rays by converting X-rays into an electrical signal.

In some embodiments, preamplifier 104 amplifies and conditions the signals generated by detector 103. The amplified output from preamplifier 105 is then received by shaping amplifier 105, which shapes the amplified signal so that it can be processed by downstream circuits. The output of shaping amplifier is then converted to a digital representation by ADC 106.

An ADC is an apparatus that converts continuous physical quantities (e.g., voltages) to digital number(s) that represent the amplitude of the physical quantities. The input signal to ADC 106 is an analog signal and the output of ADC 106 is a digital signal. An analog signal is any continuous signal for which the time varying feature (variable) of the signal is a representation of some other time varying quantity, i.e., analogous to another time varying signal. A digital signal is a physical signal that is a representation of a sequence of discrete values (a quantified discrete-time signal), for example of an arbitrary bit stream, or of a digitized (sampled and analog-to-digital converted) analog signal.

In some embodiments, ADC 106 converts analog output of shaping amplifier 105 to its corresponding digital representations. Any suitable ADC may be used to implement ADC 106. For example, ADC 106 is one of: a direct-conversion ADC (for flash ADC), a two-step flash ADC, a successive-approximation ADC (SAR ADC), a ramp-compare ADC, Wilkinson ADC, an integrating ADC, a delta-encoded ADC or counter-ramp, a pipeline ADC (also called sub ranging quantizer), a sigma-delta ADC (also known as a delta-sigma ADC), time-interleaved ADC, an ADC with intermediate FM stage, or a time-stretch ADC. For purposes of explaining the various embodiments, ADC 106 is considered a flash ADC.

In some embodiments, the electrical signal from ADC 106 may be read into a processor, such as a computer, utilizing a channel on a multi-channel analyzer (MCA). By way of a non-limiting example, a converter may take the form of a CdTe detector (e.g., detector for converting incident gamma rays into a form capable of conversion into electrical signals). For instance, a sensor in the form of a crystal, such as NaI or HPGe where gamma rays may interact with an NaI crystal sensor may be used as a converter. A person skilled in the art would appreciate that the detection efficiency of NaI crystals may improve with increasing crystal volume, and the energy resolution may be dependent on the crystal growth conditions. Higher energy resolution may be used in radioactive counting situations where a large number of lines are present in a gamma ray spectrum. An NaI crystal may output photons proportional to the gamma ray energy incident thereon. The height of the electronic pulse produced in a HPGe detector also may be proportional to gamma ray energy. With appropriate calibration, NaI and HPGe detector systems may be used to determine the energies of gamma rays from other radioactive sources.

In some embodiments, the output of detector 103 is an electrical signal, which is filtered and amplified by any known means, and then provided to data analyzer 107. In some embodiments, data analyzer 107 is a processing system such as the one described with reference to FIG. 5. In some embodiments, data analyzer 107 applies the method for optimizing nuclear or radiological counting using machine learning as described with reference to FIGS. 2-4.

Referring back to FIG. 1A, the output of data analyzer 107 can be displayed or reported (e.g., on a display 108). In some embodiments, data analyzer 107 generates an output to tune preamplifier 104. For example, the gain of preamplifier 104 can be adjusted to better amplify the signal from detector 103. In various embodiments, data analyzer 107 looks in real-time for the material of interest and as soon as it finds that material (here also referred to as the target material), it generates a control signal or one or more instructions for radiation unit 101 to stop the radiation. In this example, by identifying the material in the target and then controlling the source (e.g., radiation unit 101) according to a threshold of material identified or detected, unnecessary exposure of the material to the target (e.g., person, organic material, etc.) is avoided. The algorithm in data analyzer 107 can learn over time and train itself to quickly detect the material of interest so that the target is safeguarded from excess exposure of the material while receiving the amount of material needed. Using known methods in the machine learning art, analyzer training is achieved with supervised or semi-supervised approaches with or without additional training enhancement techniques. The utilization of weak supervision approaches to overcome limited training data availability is within the scope of the various embodiments. Similarly, bagging and boosting techniques can be used herein. It is likewise within the scope of various embodiments that learning parameters are preset prior to processing, reducing the duration to train or potentially even fully eliminating the need for training.

For example, when the target is a human body, and the material of interest is the attenuation of radiation such as photons, then the amount of photons received by the human body should be strictly controlled to avoid harmful effects to the human body. This differs from active or passive interrogation techniques described by U.S. Pat. No. 7,711,661 issued to Gentile et al. The apparatus and method of various embodiments detects the photons transmitted through the human body in real-time, and then in real-time identifies the number of photons to determine whether the number is high enough to provide the required information. The number of photons detected can be pre-determined or programmable. In some examples, when the detected photon exceeds a threshold, the processor stops the radiation of the human body or reduces the radiation level to the human body. In some embodiments, data analyzer 107 applies a training model, which is trained in real-time to quickly detect the material of interest.

The apparatus and methods described herein are particularly applicable in diagnostic imaging in medicine. The desire to reduce unnecessary dose to humans is a foundational part of all radiation protection programs, including the administration of dose to patients from diagnostic imaging protocols. Examples of this philosophy include the Image Gently campaign, whose mission is to improve safe and effective imaging care of children worldwide with a primary objective to adjust (reduce) radiation dose when imaging children but also has launched an adult radiation dose reduction effort, the American Medical Association Code on Medical Ethics Opinion that advocates for the reduction in risk associated with diagnostic imaging, and the American College of Radiology (ACR) in their position statement on CT scans and risk as well as the wide adoption of the ACR Appropriateness Criteria for diagnostic imaging. All of these organizations and efforts underscore the applicability to optimizing imaging protocols to reduce dose to humans to as low as is effectual while balancing the risk.

Figure 1B:
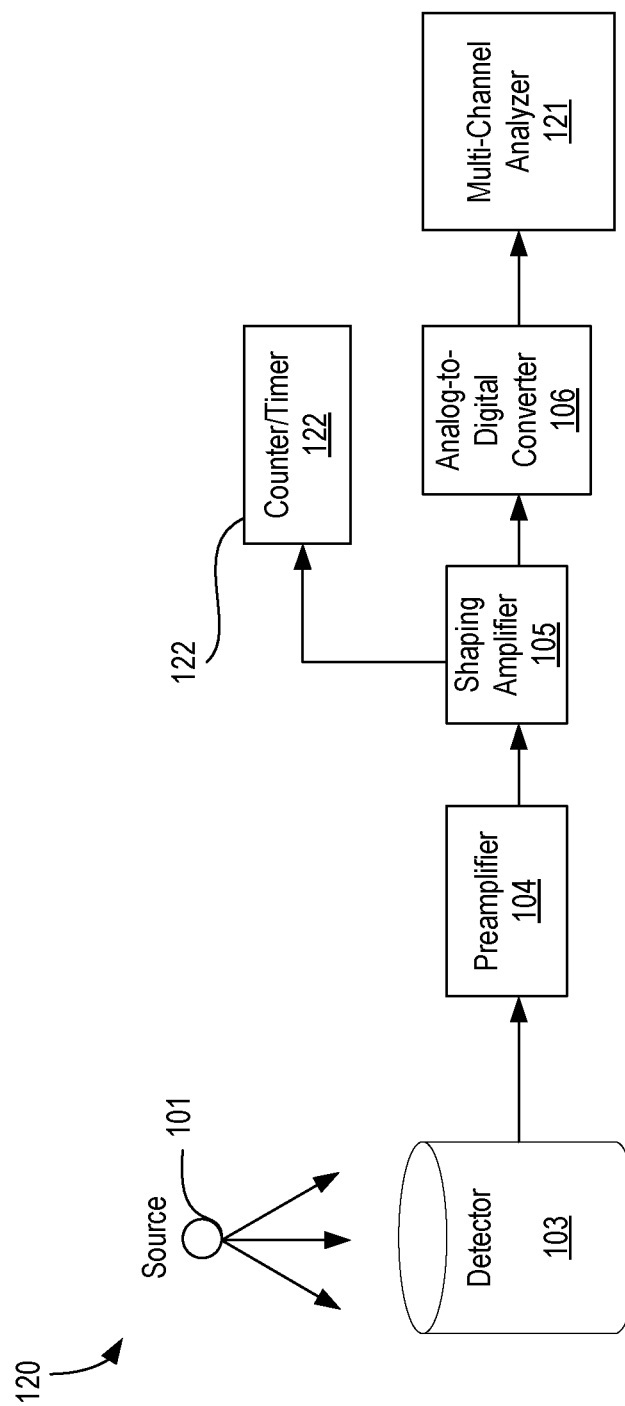
FIG. 1B illustrates an apparatus and/or system with passive detection of radiation for optimizing nuclear or radiological counting using machine learning, in accordance with some embodiments.

FIG. 1B illustrates an apparatus and/or system 120 with passive detection of radiation for optimizing nuclear or radiological counting using machine learning, in accordance with some embodiments. Apparatus/system 120 comprises a source 101 (e.g., radiation unit 101), a detector 103, a preamplifier 104, a shaping amplifier 105, an ADC 106, a multi-channel analyzer (MCA) 121, and a counter and/or timer 122. In some embodiments, there is no feedback from multi-channel analyzer 121 or counter and/or timer 122 back to source 101. Here, detector 103 detects the radiation for source 101 and provides pulses representing the radiation to preamplifier 104. The digital representation is then analyzed by MCA 121. In some embodiments, the output of shaping amplifier 105 is received by a timer or a counter 122 to count the detected material. In some embodiments, MCA 121 performs the functions of FIGS. 3-4.

Figure 2A:
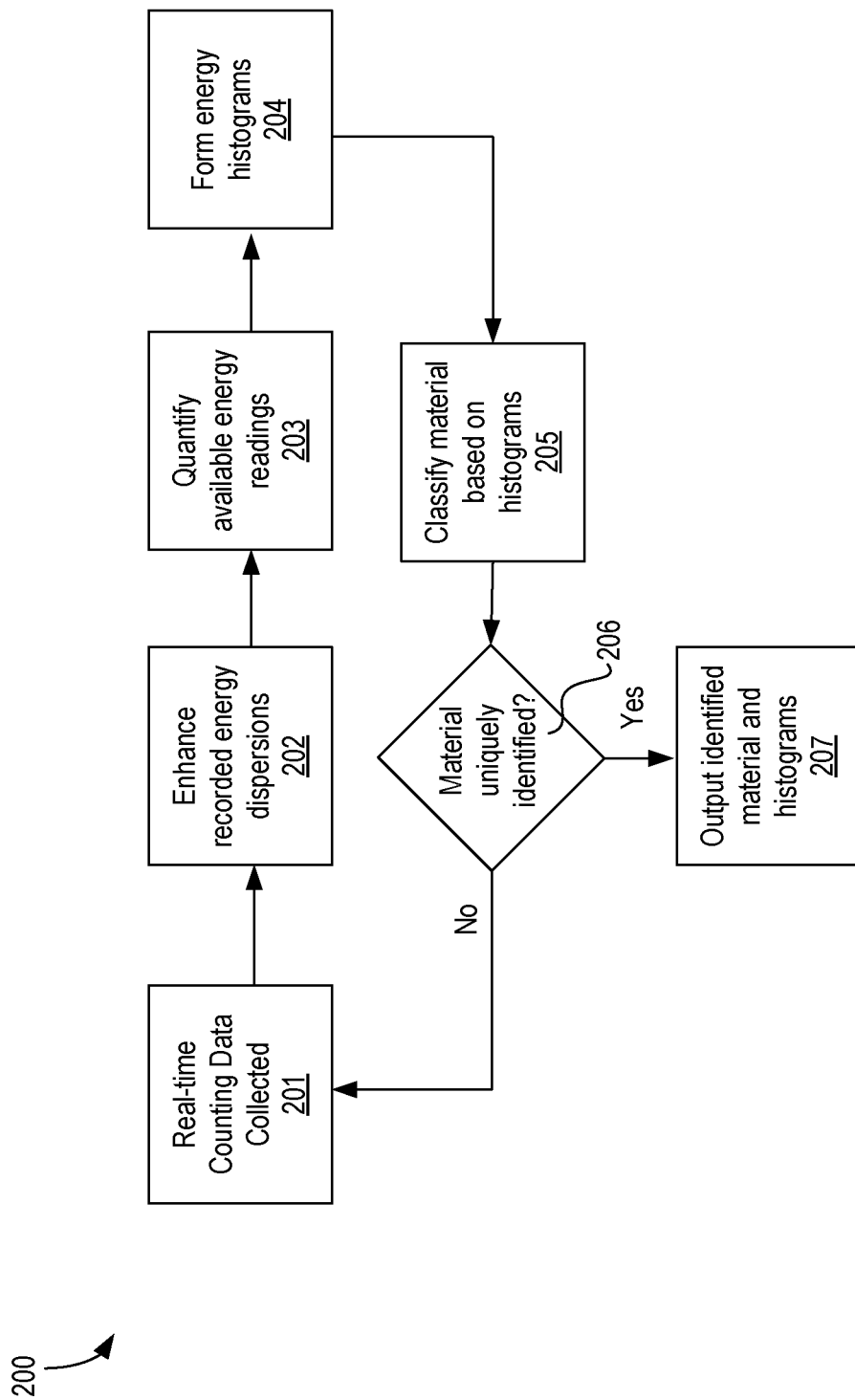
FIG. 2A illustrates a method for optimizing nuclear or radiological counting using machine learning, in accordance with some embodiments.

FIG. 2A illustrates method 200 for optimizing nuclear or radiological counting (e.g., Frieder Counting) using machine learning, in accordance with some embodiments. While the blocks are shown in a particular order, some blocks may be performed in parallel, namely, simultaneously, or staggered. At block 201, real-time counting data are collected. This process may involve Frieder Counting, for example. Frieder Counting first involves collecting time-stamped counting data off multi-channel analyzer (MCA) 121 of a counting system. This differs from the process implied in U.S. Pat. No. 7,711,661 issued to Gentile et al. where machine learning is applied to standard spectroscopy analysis based on established gamma line libraries rather than performed under real-time, continuous conditions.

In some embodiments, the real-time count is provided to block 202 and then to block 203 to enhance the recorded energy dispersion and to quantify available energy readings. In one example, Ortec Gamma Vision Gamma Spectroscopy software operates in ListMode. In this configuration, information such as the time of detection and energy channel, as well as live and real-time data are collected and streamed to a computer every 10 milliseconds. Following data retrieval, the cache is cleared, and data are routed to a computer for analysis. The computer or data analyzer 107 may be a server in a cloud or any suitable computing device that can perform fast computation (e.g., in the GHz frequency). The resulting data file contains the detected count, its respective time of occurrence, the channel in which the count occurred, and the running of live and real times.

Once the counting data are collected, the time dependent channel information is grouped into histograms as illustrated by block 204. By grouping the data in this manner, an interval matrix of the integral of counts in each channel is created, in accordance with various embodiments. If the desire were to identify specific radionuclides, then it would be advantageous to associate the channel with a specific energy, which can be obtained by energy calibrating the detector system. However, in some examples, work on temporal spectroscopy has suggested that specific energy information may not be necessary for some materials. As an example, specific energy information is not necessary to identify the presence of fissile materials such as $^{239}$Pu or $^{235}$U. Once the data are properly arranged into a matrix, such as matrix 220 as shown in FIG. 2B, several techniques can be applied to create training material for classification by block 205.

Once classification is performed of the material based on histograms by block 205, a determination is made at block 206 regarding the type and count of material. If the classified material meets the threshold requirements (e.g., amount, type, etc.), then a report is issued (e.g., the data are displayed, a user is identified, and alarm is set off, etc.) and a control instruction is sent to the radiation unit (e.g., source of the radiating material) as indicated by block 207. In some embodiments, the control instruction (which can use any known suitable format) informs the radiation unit to take a certain action (e.g., to stop radiation, reduce the radiation, etc.). If the determination results in a decision that the material of interest is not identified from the classified material, then the apparatus continues to count the data associated with the detected material as indicated by block 201.

Figure 3:
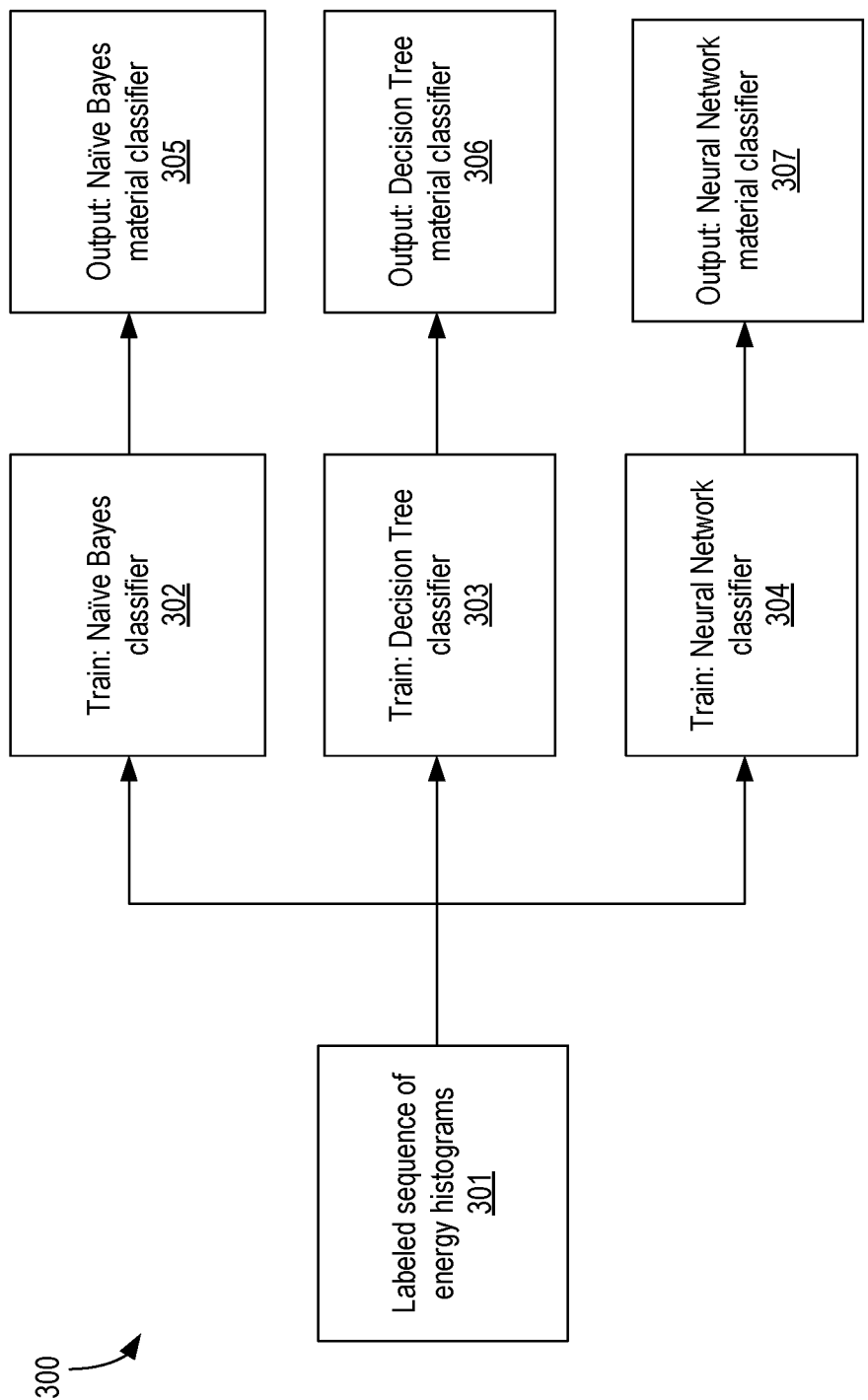
FIG. 3 illustrates a method for multiple machine learning techniques applied to histograms, in accordance with some embodiments.

FIG. 3 illustrates a method 300 for multiple machine learning techniques applied to histograms, in accordance with some embodiments. The method illustrates the flow of information for three different machine-learning applications-Bayesian statistical modeling or probabilistic approaches, use of decision trees (e.g., Markov models using decision trees), and neural network approaches. Method 300 processes the histograms from block 204, in accordance with some embodiments. In some embodiments, the sequence of energy histograms are labeled at block 301 and then provided to any number of classifiers where the classifiers are trained. For example, at block 302 Naïve Bayes classifier is trained using the labeled sequence of energy histograms, at block 303 Decision Tree classifier is trained using the labeled sequence of energy histograms, at block 304 Neural Network classifier is trained using the labeled sequence of energy histograms. While the embodiment illustrates three classifiers, fewer or more classifiers may be used. Differing training data can be used on the same type of classifier to achieve a different model instantiation. All such and aforementioned models can be used in parallel, sequential, or any combination thereof.

Each classifier provides its corresponding output of classified material, which is then processed to determine the material of interest. For example, at block 305, the output indicating material of interest using Naïve Bayes classifier 302 is provided, at block 306 the output indicating material of interest using Decision Tree classifier 303 is provided, and at block 307 the output indicating material of interest using Neural Network classifier 303 is provided.

The three classifiers illustrated in method 300 are merely illustrative. Many classifiers are known in the art, and for each classifier, many variations and instantiations exist. Their corresponding results can be fused, voted upon to meet a certain threshold, or chosen and integrated using any combining technique. Exemplary implementations, however, are widely available including but not limited as part of the software "workbench" called Weka, for Waikato Environment for Knowledge Analysis. By having multiple instantiations of the same classifier as well as a diversity of classifiers trained in a diversity of ways, the chances of detecting the material of interest can increase.

Figure 4:
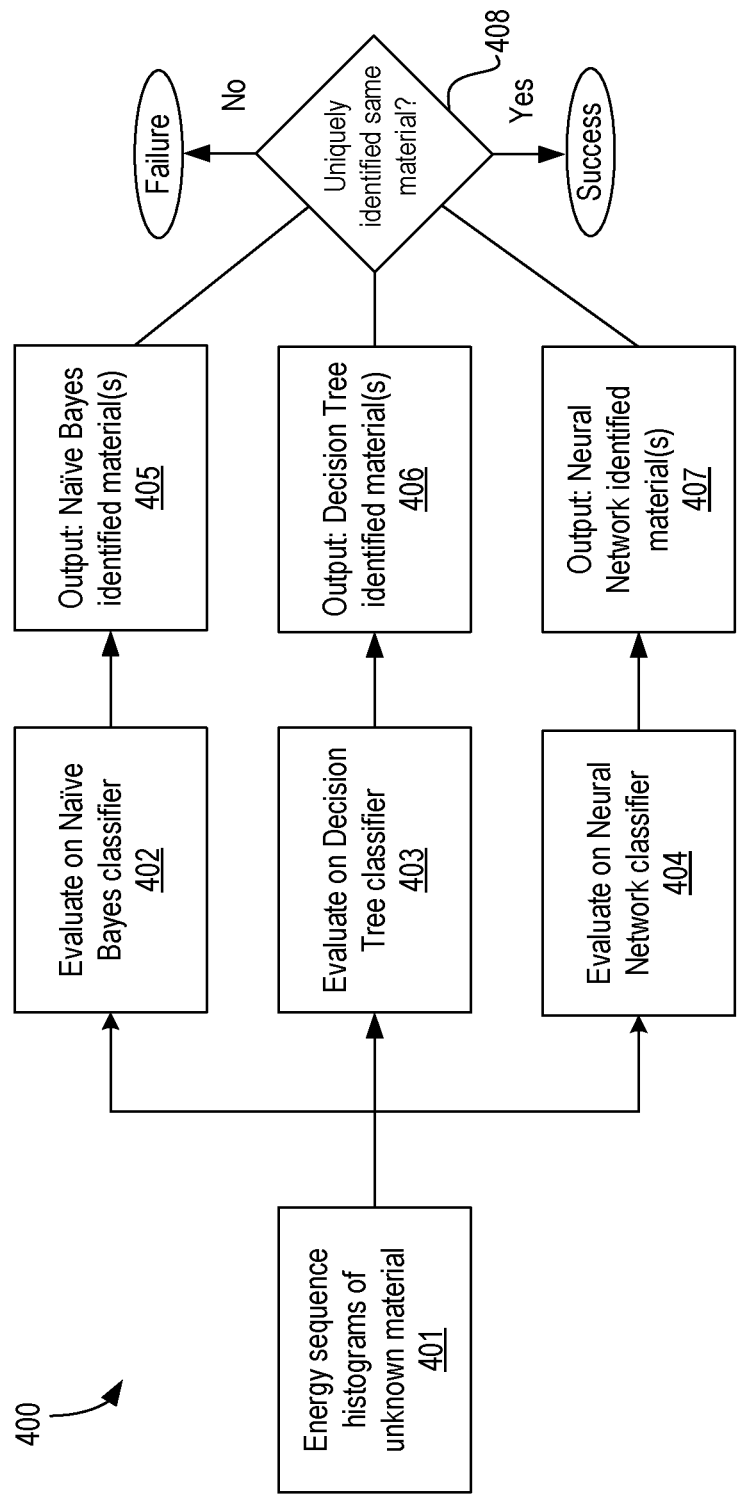
FIG. 4 illustrates a method for classifying material, in accordance with some embodiments.

FIG. 4 illustrates a method 400 for classifying material and identifying the material of interest, in accordance with some embodiments. Here, once the classification process is complete, a comparison of the classification output against previously identified materials or radioactive constituents occurs. For example, from block 401, the energy sequence of histograms of unknown material is evaluated. Continuing with the trained classification models from method 300, three evaluations of the energy sequence of histograms are performed using the three respective trained classification models.

At block 402, energy sequence of histograms is evaluated for the material of interest using the Naïve Bayes classifier. At block 403, energy sequence of histograms is evaluated for the material of interest using the Decision Tree classifier. At block 404, energy sequence of histograms is evaluated for the material of interest using the Neural Network classifier. The respective outputs from each evaluation are indicated by blocks 405, 406, and 407. These outputs are then analyzed at block 408 to determine if there is sufficient confidence of the presence of the identified material. If the material/radioisotope is successfully matched, the algorithm concludes and a control signal is issued for the radiation unit 101. Otherwise, the material/radioisotope is not successfully matched, another iteration within the system transpires, repeating until a successful match or a reaching of a predetermined termination condition.

The data are collected in real-time, with the analysis continuously performed. This potentially reduces the time spent identifying the material/radioisotopes. This approach is useful in any generic nuclear or radiological detection counting circumstance where the count time would be likely reduced if not actually optimized with respect to some minimum detectable activity or counts. Note that the stepping time quantum effects optimality. A small time quantum potentially necessitates many steps, hence involves greater processing overhead, yet can achieve a reduction in the total dosage introduced.

In one example, this technique is advantageous in determining uranium burnup in pebble bed reactor fuel. Instead of waiting a predetermined amount of time, Frieder Counting determines the counting time needed for each fuel sample, and that time is independent of any other counting time determination for other fuel samples.

In another example, applications involving medical administration of one or plurality of radiation doses to the patient is minimized to produce the shortest time necessary to produce the necessary information. This falls into two broad categories: contrast and dose. Applications that involve radiation dose to a patient potentially could include brachytherapy or other therapeutic applications of radiation dose. For contrast approaches to diagnostic imaging, this may include such applications as single-photon emission computed tomography (SPECT), positron emission tomography (PET), fluoroscopy, or conventional nuclear planar imaging (scintigraphy). While the use of machine learning techniques has been applied to radiology and medical imaging, it is limited to interpretation of the images produced to facilitate diagnosis.

Figure 5:
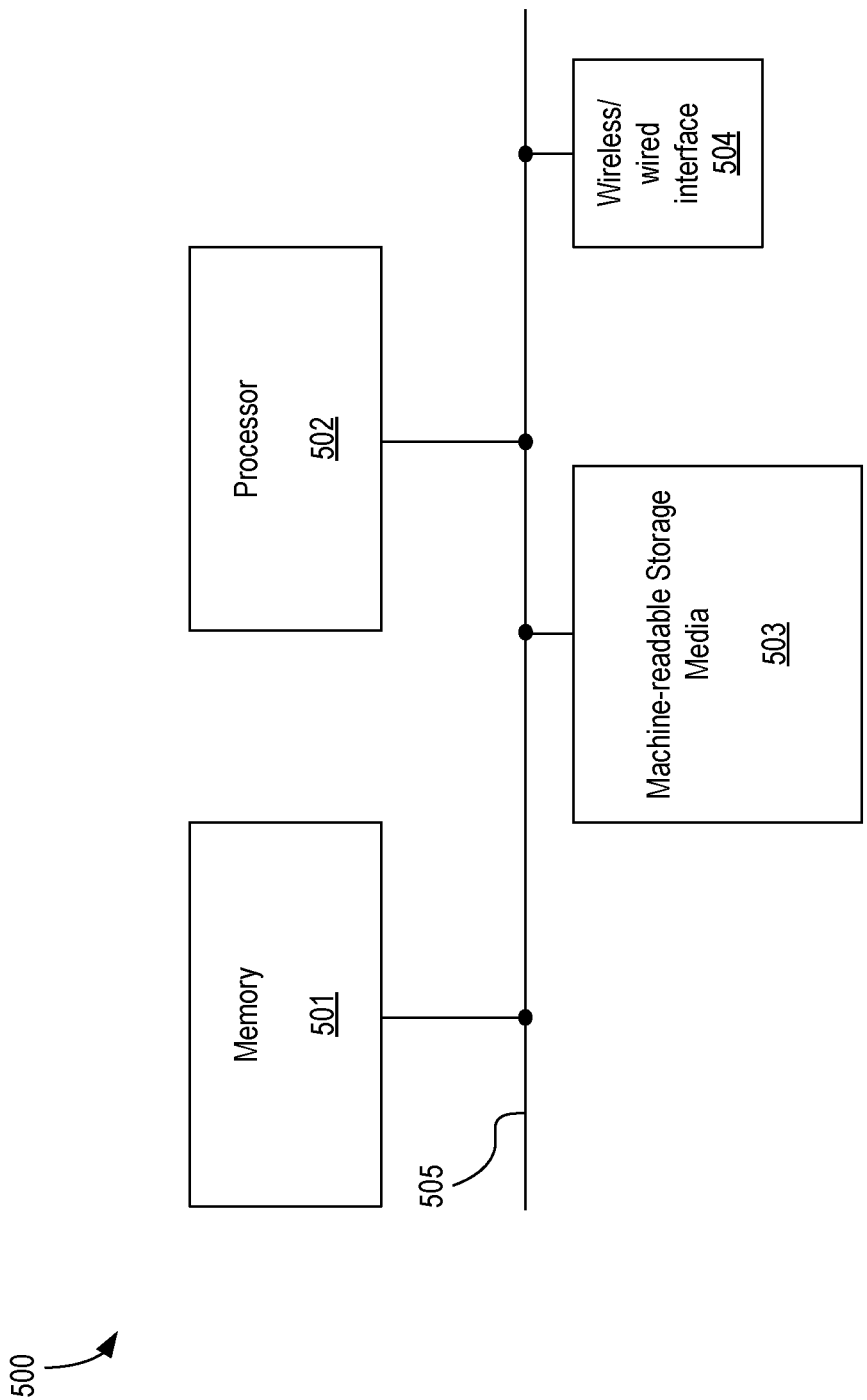
FIG. 5 illustrates a computing platform with machine-readable storage media having instructions stored thereon to perform a method for optimizing nuclear or radiological counting using machine learning, in accordance with some embodiments.

FIG. 5 illustrates a computing platform 500 with machine-readable storage media having instructions stored thereon to perform a method optimizing nuclear or radiological counting using machine learning, in accordance with some embodiments. Computing platform 500 is a simplified version of a computing device that includes memory 501, processor 502, machine-readable storage media 503, communication interface 504 (e.g., wireless or wired interface), and network bus 505 coupled together as shown.

Elements of embodiments (e.g., flowchart 200, 300, 400, and the scheme described with reference to FIGS. 2-4) are also provided as a machine-readable medium (e.g., memory) for storing the computer-executable instructions (e.g., instructions to implement any other processes discussed herein).

In some embodiments, processor 502 is a Digital Signal Processor (DSP), an Application Specific Integrated Circuit (ASIC), a general-purpose Central Processing Unit (CPU), or a low power logic implementing a simple finite state machine to perform the method of flowcharts 200-400 and/or various embodiments, etc.

In some embodiments, the various logic blocks of system 500 are coupled together via network bus 505. Any suitable protocol may be used to implement Network Bus 505. In some embodiments, Machine-Readable Storage Medium 501 includes instructions (also referred to as the program software code/instructions) for calculating or measuring distance and relative orientation of a device with reference to another device as described with reference to various embodiments and flowchart.

Program software code/instructions associated with flowcharts 200-400 (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowcharts 200-400 (and/or various embodiments) are executed by system 500.

In some embodiments, the program software code/instructions associated with flowcharts 200-400 (and/or various embodiments) are stored in a computer executable storage medium 503 and executed by processor 502. Here, computer executable storage medium 503 is a tangible machine readable medium that can be used to store program software code/instructions and data that, when executed by a computing device, causes one or more processors (e.g., processor 502) to perform a method(s) as may be recited in one or more accompanying claims directed to the disclosed subject matter.

The tangible machine-readable medium 503 may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer-to-peer networks and the like, including the Internet. Different portions of the software program code/instructions and data are obtained at different times and in different communication sessions or in the same communication session.

The software program code/instructions (associated with flowcharts 200-400 and other embodiments) and data are obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine-readable medium in entirety at a particular instance of time.

Examples of tangible computer-readable media 503 include but are not limited to recordable and non-recordable type media such as volatile and non-volatile memory devices, read-only memory (ROM), random-access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc., through such tangible communication links.

In general, tangible machine-readable medium 503 includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, or a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

The following examples are provided with reference to various embodiments. These examples can be combined in any way. For example, apparatus of one example can be combined with the apparatus of another example.

Example 1: An apparatus to reduce counting times in radiation detection systems, the apparatus comprising: a detector to detect a target material in real-time and to provide output data; and a processor coupled to the detector, wherein the processor is to: receive the output data; analyze the output data in real-time; identify a material of interest from the analyzed output data; and control a source of the target material.

Example 2: The apparatus of example 1, wherein the processor is to analyze the output data by performing real-time counting of a material in the output data.

Example 3: The apparatus of example 2, wherein the processor is to enhance recorded energy dispersions in response to the performed real-time count.

Example 4: The apparatus of example 3, wherein the processor is to quantify available energy readings of the enhanced recorded energy dispersions.

Example 5: The apparatus of example 4, wherein the processor is to generate energy histograms from the quantified available energy readings.

Example 6: The apparatus of example 5, wherein the processor is to classify the target material based on the energy histograms.

Example 7: The apparatus of example 6, wherein the processor is to identify the target material, and to send an instruction to the source to control the source of the target material.

Example 8: The apparatus of example 5, wherein the target material is classified according to two or more training models.

Example 9: The apparatus of example 8, wherein the two or more training models are of the same type but trained on different data.

Example 10: The apparatus of example 8, wherein the two or more training models are of the differing types but trained on the same data.

Example 11: The apparatus of example 8, wherein the two or more training models are of the differing types and are trained on different data.

Example 12: The apparatus according to any one of examples 1 to 11, wherein the target material is a radiation material.

Example 13: The apparatus according to any one of examples 1 to 11, wherein to control the source of the target material comprises to stop the source from radiating or to reduce radiation from the source.

Example 14: A method to reduce the counting times in radiation detection systems, the method comprising: receiving output data from a detector which is to detect a target material from a target body; analyzing the output data in real-time; identifying a material of interest from the analyzed output data; and controlling a source of the target material to prevent the source from harming the target body.

Example 15: The method of example 14, wherein analyzing the output data comprises: performing real-time counting of a material in the output data; enhancing recorded energy dispersions in response to the performed real-time count; quantifying available energy readings of the enhanced recorded energy dispersions; generating energy histograms from the quantified available energy readings; and classifying the target material based on the energy histograms.

Example 16: The method of example 15, wherein classifying the target material comprises training two or more models to detect or identify the target material.

Example 17: The method according to any one of examples 14 to 15, wherein controlling the source of the target material comprises stopping the source from radiating or reducing radiation from the source.

Example 18: The method according to any one of examples 14 to 15, wherein the target body is an organic body, and wherein the target material is a radiation material.

Example 19: A machine-readable storage media having machine executable instructions, that when executed, cause a machine to perform a method according to any one of examples 14 to 18.

Example 20: A system comprising: a radiation source to radiate a target material; a detector to detect the target material in real-time and to provide an output data; a processor coupled to the detector, wherein the processor is to: receive the output data; analyze the output data; identify a material of interest from the analyzed output data; and control a source of the target material; and a display to the analyzed output data.

Example 21: The system of example 20 according to any one of examples 2 to 13.

Example 22: An apparatus which comprises means for performing the method of any one of examples 14 to 18.

While the disclosure has been described in conjunction with specific embodiments thereof, many alternatives, modifications, and variations of such embodiments will be apparent to those of ordinary skill in the art, in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth to describe example embodiments of the disclosure, it should be apparent to one skilled in the art that the disclosure can be practiced without, or with variation of, these specific details. The description is thus to be regarded as illustrative instead of limiting.

What is claimed is:

1. An apparatus to reduce counting times in radiation detection systems, the apparatus comprising:
   a detector to detect a target material and to provide output data; and
   a processor coupled to the detector, wherein the processor is to:
   analyze the output data;
   collect time-stamped counting data from a multi-channel analyzer to analyze the output data;
   identify a material of interest from the analyzed output data; and
   control a source of the target material.

2. The apparatus of claim 1, wherein the processor is to count a material in the output data to analyze the output data.

3. The apparatus of claim 1, wherein the target material is classified according to two or more machine-learning training models, and wherein, the two or more machine-learning training models are applied in parallel, sequential, or a combination of them.

4. The apparatus of claim 3, wherein the two or more machine-learning training models include a Bayesian statistical model and a Markov model.

5. The apparatus of claim 3, wherein the two or more machine-learning training models are one of:
   same type but trained on different data;
   differing types but trained on same data; or
   differing types but trained on different data.

6. The apparatus of claim 1, wherein the target material is classified according to a machine-learning training model.

7. The apparatus of claim 1, wherein the processor is to classify the target material based on energy histograms.

8. The apparatus of claim 1, wherein the processor is to identify the target material, and to send an instruction to the source to control the source of the target material.

9. The apparatus of claim 1, wherein the target material is a radiation material.

10. The apparatus of claim 1, wherein the processor is to stop the source from radiating or to reduce radiation from the source to control the source of the target material.

11. A method to reduce counting times in radiation detection systems, the method comprising:
    analyzing output data by collecting time-stamped counting data from a multi-channel analyzer, wherein the output data are from a detector which is to detect a target material from a target body;
    identifying a material of interest from the analyzed output data; and
    controlling a source of the target material to reduce the counting times.

12. The method of claim 11, wherein analyzing the output data comprises counting a material in the output data.

13. The method of claim 11, wherein analyzing the output data comprises:
    classifying the target material according to two or more machine-learning training models, wherein classifying the target material comprises applying the two or more machine-learning training models in parallel, sequentially, or a combination of them.

14. The method of claim 13, wherein the two or more machine-learning training models are one of:
    same type but trained on different data;
    differing types but trained on same data; or
    differing types but trained on different data.

15. The method of claim 11, wherein analyzing the output data comprises classifying the target material according to a machine-learning training model.

16. The method of claim 11, wherein analyzing the output data comprises classifying the target material based on energy histograms.

17. A system comprising:
    a radiation source to radiate a target material;
    a detector to detect the target material and to provide output data;
    a processor coupled to the detector, wherein the processor is to:
    analyze the output data;
    collect time-stamped counting data from a multi-channel analyzer to analyze the output data;
    identify a material of interest from the analyzed output data; and
    control a source of the target material; and
    a display to display the analyzed output data.

18. The system of claim 17, wherein the processor is to count a material in the output data to analyze the output data.

19. The system of claim 17, wherein the target material is classified according to two or more machine-learning training models, and wherein the two or more machine-learning training models are applied in parallel, sequentially, or a combination of them.

20. The system of claim 17, wherein the target material is classified according to a machine-learning training model.

* * * * *